Patented Mar. 20, 1934

1,951,377

UNITED STATES PATENT OFFICE 1,951,377

METHOD OF FORMING RUBBER GLOVES

Douglas Frank Twiss, Wylde Green, and Edward Arthur Murphy, Erdington, Birmingham, England, assignors to Dunlop Rubber Company, Limited, Erdington, Birmingham, England, a British corporation No Drawing. Application September 4, 1931, Serial No. 561,250. In Great Britain September 22, 1930

3 Claims. (Cl. 18—58)

This invention is concerned with a method for the provison of an improved former or mold or surface having patterns, markings or other ornamentations thereon such as wrinkled, corrugated or grained effects for the production of articles of or containing organic materials of the kinds hereinafter specified.

The object of the invention is to produce a master mold or former or surface having the desired patterns, markings or other ornamentations thereon, thereby permitting the production of articles of or containing organic materials of the kinds hereinafter specified having a standard degree of pattern, marking or other ornamentation.

According to the invention the method for the provision of an improved former or mold or surface having patterns, markings or other ornamentations thereon such as wrinkled, corrugated or grained effects for the production of articles of or containing organic materials of the kinds hereinafter specified comprises coating formers, molds or backing surfaces with aqueous dispersions of organic materials of the kinds hereinafter specified, or solutions thereof in organic solvents, inducing such movement of the applied fluid layers relative to the formers, molds or backing surfaces as to cause localized irregularities in the applied surface layers and then rendering permanent the uniform irregularly shaped pattern, marking or ornamentation so produced by subsequent or concurrent solidification.

The master former or mold thus produced can either itself be directly used for the production of articles thereon or alternatively the master former or mold can be used for the production of replicas thereof according to known methods.

According to one embodiment of the invention the aforesaid master mold can be made with a surface of ebonite the surface of which has been provided in the described manner, with, for instance, wrinkled, corrugated or grained effects to obtain a uniform wrinkling of the desired degree of intensity.

A dipping former for instance as commonly used for the production of a rubber glove is provided with an unvulcanized coating of rubber which is vulcanizable either to a soft rubber or hard vulcanite-like condition.

The coating may be applied for instance by any one or more operations such as dipping, spreading, or spraying the former with a rubber latex mixing containing sufficient sulphur and accelerators to permit vulcanization to the hard condition.

Before completion of the vulcanization however, the rubber coating is caused to assume a natural wrinkled surface of the desired type.

Where deposits have been obtained from rubber latex the wrinkled or corrugated or grained effects if desired can be given according to the process described in British Patent No. 324,988. According to this process uncoagulated layers of the dispersions are brought into contact with single or mixed liquids which effect coagulation and swelling concurrently or alternatively bringing the uncoagulated surface into contact with two liquids, one of which effects coagulation and the other swelling. Examples of a liquid that effects coagulation is glacial acetic acid, and an example of a swelling agent is benzene or a liquid having combined coagulating and swelling action such as carbon tetrachloride or butyl acetate may be employed. Vulcanization is subsequently effected care being taken not to impair the wrinkling in any way.

When a former has thus been produced with a vulcanized coating of approved uniformity and intensity of wrinkling it can be used as a master pattern for the production of for instance, clay or plaster of Paris or metallic reproductions. The reproductions may then be used directly for the production of articles of or containing organic materials directly from aqueous dispersions or solutions thereof.

In a further embodiment of the invention the aforesaid master mold or former or surface can be made with a surface showing irregular patterns or ornamentations suggestive of the wave markings for example on certain leathers such as crocodile or alligator leather by applying to a mold or former or surface aqueous emulsions or dispersions of the kinds hereinafter specified under such conditions that coagula of initially low mechanical strength are produced as for instance by adjusting any one or more of such factors as alkalinity or concentration of the aforesaid emulsions or dispersions and also if desired the strength of the coagulating medium employed. The deposit can also be obtained by the use of rubber solutions.

The use of formers or molds or surfaces made according to the embodiments of this invention leads to the production of articles having more or less smooth outer surface but with an inner surface bearing the desired markings.

The articles are subsequently stripped from the aforesaid formers or molds. If desired, the articles are then reversed so that the outer surfaces show the desired markings. The articles are preferably vulcanized on the former before removal.

The use of formers or molds produced according to the present invention leads to the formation of articles with markings of identical distribution and degree of marking.

If desired the master pattern or the resulting reproductions such as clay formers can be treated so as to remove the marking from portions thereof e. g. in the case of a glove former the marking or wrinking can be removed from the back of the hand where it may be of less importance.

The surfaces of the master formers or molds as well as the articles to be produced directly thereon or on replicas thereof can be made from natural or artificial dispersions of rubber or other natural resins in non-vulcanized or vulcanized condition, synthetic rubbers and rubber-like substance, in non-compounded or compounded condition. These organic substances may also, if desired, be employed in solution in organic solvents. Any one or more of these organic substances may also be employed as alternatives or admixtures.

Having now particularly described and ascertained the nature of our said invention and in what manner the same is to be performed, we declare that—

What we claim is:

1. A process for producing rubber gloves of an identical irregular or haphazard roughness which comprises depositing on a former a vulcanizable surface coating from a dispersion thereof, simultaneously swelling and coagulating said surface coating to cause wrinkling, fixing said wrinkled surfaces to a rigid permanent surface on said former, and forming successive rubber gloves against said wrinkled surface.

2. A process for producing rubber gloves of an identical irregular or haphazard surface roughness which comprises depositing on a former a superficial vulcanizable coating from an aqueous dispersion thereof, drawing said surfaces into irregular wrinkles by surface modifications in the tension of said surfaces, hardening said coatings to a structure united to the former, and reproducing successive rubber gloves by molding on said wrinkled surface.

3. A process for producing rubber gloves of an identical irregular or haphazard surface roughness which comprises depositing on formers vulcanizable surface coatings from an aqueous dispersion, causing said surfaces to wrinkle by simultaneously swelling and coagulating said dispersion, fixing and hardening said wrinkled surface coatings to a hard integral structure on said formers, selecting one of said surfaces, and forming successive rubber gloves by molding on said selected wrinkled surface.

DOUGLAS FRANK TWISS.
EDWARD ARTHUR MURPHY.